United States Patent
Funamizu et al.

(10) Patent No.: US 10,462,392 B2
(45) Date of Patent: Oct. 29, 2019

(54) IMAGE SENSOR AND IMAGE-CAPTURING DEVICE

(71) Applicant: NIKON CORPORATION, Tokyo (JP)

(72) Inventors: Wataru Funamizu, Yokohama (JP); Masahiro Juen, Yokohama (JP); Atsushi Komai, Tokorozawa (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/764,157

(22) PCT Filed: Sep. 27, 2016

(86) PCT No.: PCT/JP2016/078497
§ 371 (c)(1),
(2) Date: Mar. 28, 2018

(87) PCT Pub. No.: WO2017/057382
PCT Pub. Date: Apr. 6, 2017

(65) Prior Publication Data
US 2019/0058838 A1 Feb. 21, 2019

(30) Foreign Application Priority Data
Sep. 30, 2015 (JP) ................. 2015-195284

(51) Int. Cl.
*H04N 5/353* (2011.01)
*H04N 5/378* (2011.01)
*H04N 5/3745* (2011.01)
*H04N 5/369* (2011.01)

(52) U.S. Cl.
CPC ......... *H04N 5/3535* (2013.01); *H04N 5/3698* (2013.01); *H04N 5/378* (2013.01); *H04N 5/379* (2018.08); *H04N 5/3745* (2013.01)

(58) Field of Classification Search
CPC .... H04N 5/3535; H04N 5/3698; H04N 5/379; H04N 5/3745; H04N 5/378
See application file for complete search history.

(56) References Cited

U.S. PATENT DOCUMENTS

2006/0023109 A1  2/2006 Mabuchi et al.
2007/0146514 A1* 6/2007 Maeda ................. H04N 5/3456
                                                      348/294
(Continued)

FOREIGN PATENT DOCUMENTS

JP   2006-049361 A   2/2006
JP   2009-290628 A   12/2009
(Continued)

OTHER PUBLICATIONS

Jan. 30, 2019 Extended European Search Report issued in European Patent Application No. 16851553.4.
(Continued)

*Primary Examiner* — Gevell V Selby
(74) *Attorney, Agent, or Firm* — Oliff PLC

(57) ABSTRACT

An image sensor includes: a first readout circuit that reads out a first signal, being generated by an electric charge resulting from a photoelectric conversion, to a first signal line; a first holding circuit that holds a voltage based on an electric current from a power supply circuit; and a first electric current source that supplies the first signal line with an electric current generated by the voltage held in the first holding circuit, wherein: the first holding circuit holds the voltage based on the electric current from the power supply circuit when the first signal is not read out to the first signal line by the first readout circuit.

10 Claims, 12 Drawing Sheets

(56) References Cited

U.S. PATENT DOCUMENTS

| | | | |
|---|---|---|---|
| 2008/0273093 A1* | 11/2008 | Okita | H04N 5/23245 348/220.1 |
| 2009/0090844 A1 | 4/2009 | Yon et al. | |
| 2009/0295968 A1 | 12/2009 | Matsuda et al. | |
| 2011/0115958 A1* | 5/2011 | Koseki | H04N 5/3658 348/308 |
| 2012/0099010 A1 | 4/2012 | Sugiyama et al. | |
| 2016/0182842 A1 | 6/2016 | Mabuchi | |
| 2016/0219234 A1 | 7/2016 | Nishihara | |
| 2017/0195603 A1 | 7/2017 | Kawazu et al. | |

FOREIGN PATENT DOCUMENTS

| | | |
|---|---|---|
| JP | 2012-244331 A | 12/2012 |
| TW | 201134212 A | 10/2011 |
| TW | 201433164 A | 8/2014 |
| TW | 201536054 A | 9/2015 |
| WO | 2015/019836 A1 | 2/2015 |

OTHER PUBLICATIONS

Nov. 16, 2017 Office Action issued in Taiwanese Patent Application No. 105131638.

Loinaz et al; "A 200-mW, 3.3-V, CMOS Color Camera IC Producing 352 × 288 24-b Video at 30 Frames/s"; Dec. 1998; IEEE Journal of Solid-State Circuits; vol. 33; No. 12; pp. 2092-2103.

Dec. 20, 2016 International Search Report issued in International Patent Application No. PCT/JP2016/078497.

Jun. 4, 2019 Office Action issued in Japanese Patent Appliaction No. 2017-543440.

* cited by examiner

IMAGE SENSOR AND IMAGE-CAPTURING DEVICE

TECHNICAL FIELD

The present invention relates to an image sensor and an image-capturing device.

BACKGROUND ART

An image-capturing device has been known which can perform parallel processing of signals read from pixels for individual unit pixel cells or for individual cells including a plurality of pixels (PTL1).

CITATION LIST

Patent Literature

PTL1: Japanese Laid-Open Patent Publication No. 2012-244331

SUMMARY OF INVENTION

According to the first aspect of the present invention, an image sensor comprises: a first readout circuit that reads out a first signal, being generated by an electric charge resulting from a photoelectric conversion, to a first signal line; a first holding circuit that holds a voltage based on an electric current from a power supply circuit; and a first electric current source that supplies the first signal line with an electric current generated by the voltage held in the first holding circuit, wherein: the first holding circuit holds the voltage based on the electric current from the power supply circuit when the first signal is not read out to the first signal line by the first readout circuit.

DESCRIPTION OF EMBODIMENTS

First Embodiment

Figure 1:
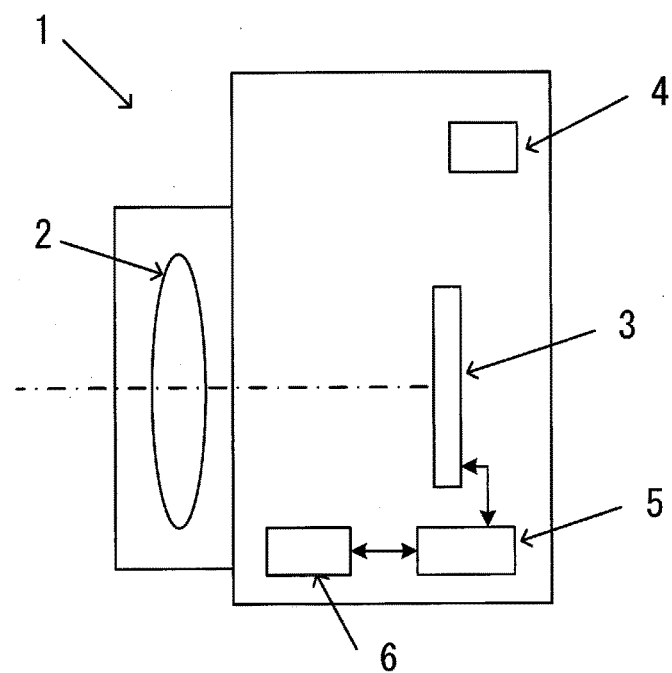
FIG. 1 is a block diagram illustrating a configuration of an image-capturing device 1 according to a first embodiment.

FIG. 1 is a block diagram illustrating a configuration of an image-capturing device 1 according to a first embodiment. The image-capturing device 1 includes an optical system 2, an image sensor 3, an operation unit 4, a control unit 5, and a long exposure setting unit 6. The optical system 2 transmits light from a subject to the image sensor 3. The image sensor 3 captures an image of the light transmitted from the optical system 2 and generates image data, for example. The control unit 5 performs various types of image processing on the image data outputted from the image sensor 3. The control unit 5 further outputs a control signal for controlling operations of the image sensor 3 to the image sensor 3. It should be noted that the optical system 2 may be detachable from the image-capturing device 1.

The operation unit 4 includes various operation members such as a release operation member that starts a shooting operation, a zoom operation member that starts a zooming operation of the optical system 2, and a mode selection operation member that selects among various shooting modes. The operation unit 4 outputs operation signals based on the operation of each of the operation members. The control unit 5 generates a control signal based on the operation signal outputted from the operation unit 4, for example, to control the components of the image sensor 1 such as the image sensor 3.

The long exposure setting unit 6 sets a long shooting (exposure), an exposure time of one second or longer, for example. The long exposure setting unit 6 includes, for example, a time shooting setting unit that starts an exposure in response to a depression of the release operation member and terminates the exposure in response to second depression of the release operation member; a bulb shooting setting unit that starts an exposure in response to a depression of the release operation member, continues the exposure during the depression, and terminates the exposure in response to the end of the depression of the release operation member; an automatic exposure calculation unit that automatically sets a long exposure period based on a luminance of a subject; and a manual long exposure setting unit that sets a long exposure period by a manual operation.

Figure 2:
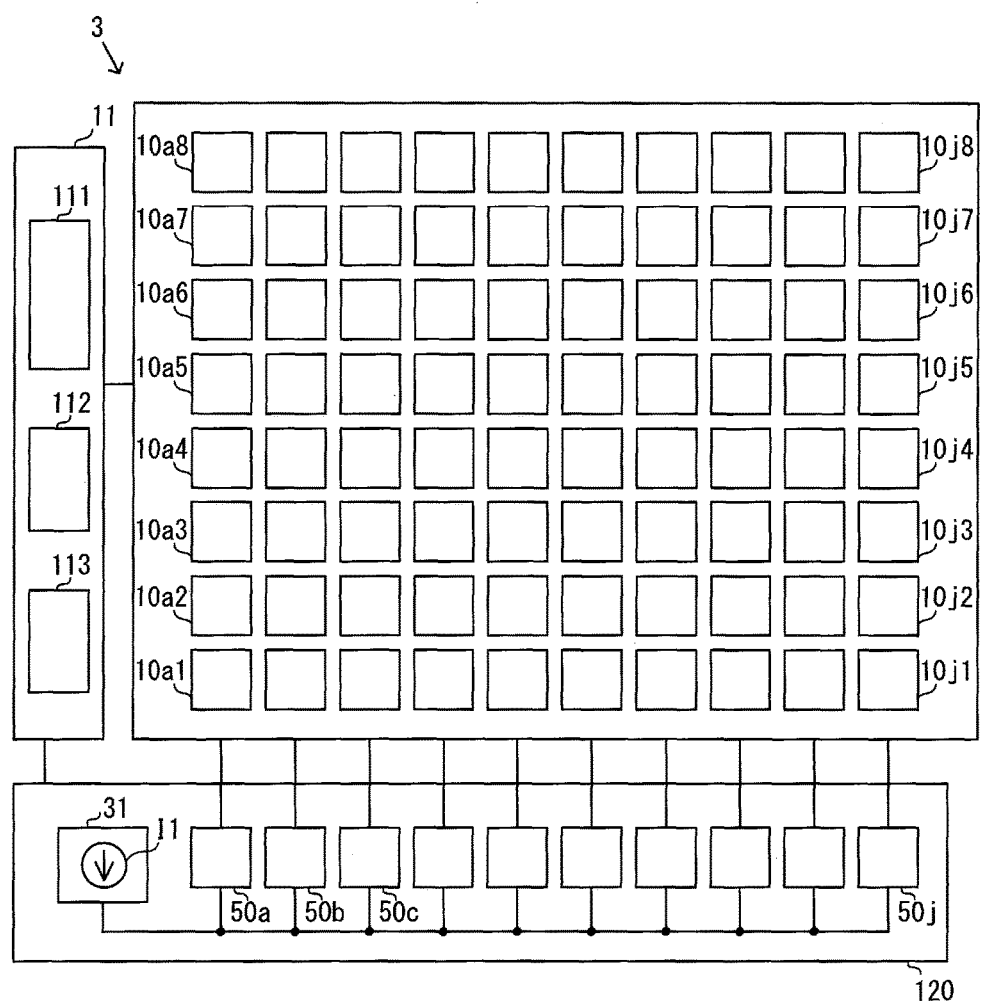
FIG. 2 is a block diagram illustrating a configuration of an image sensor 3 according to the first embodiment.

FIG. 2 is a block diagram illustrating a configuration of the image sensor 3 according to the first embodiment. The image sensor 3 includes a plurality of pixels 10 arranged in a matrix, a pixel control unit 11 that controls the pixels 10, and an electric current source circuit unit 120. The pixel control unit 11 includes a charge accumulation time control unit 111, a bias voltage preset unit 112, and a bias voltage refresh unit 113.

The charge accumulation time control unit 111 controls a charge accumulation time of the pixels 10. The bias voltage preset unit 112 presets a bias voltage based on an operation signal depending on the operation of the release operation member, as will be described later in detail. The bias voltage refresh unit 113 generates a refresh timing signal for refreshing the bias voltage, as will be described later in detail.

For the sake of convenience, the pixels 10 are arranged in eight rows×ten columns. In other words, eight pixels 10 are arranged in a column direction (in a vertical direction in FIG. 2), and ten pixels 10 are arranged in a row direction (in a horizontal direction in FIG. 2). The electric current source circuit unit 120 includes as many (i.e., 10) electric current source circuits 50a to 50j as the pixels 10 arranged in one row, and also includes a reference electric current source circuit 31 including a reference electric current source I1 that supplies reference electric current to the plurality of electric current source circuits 50.

Figure 3:
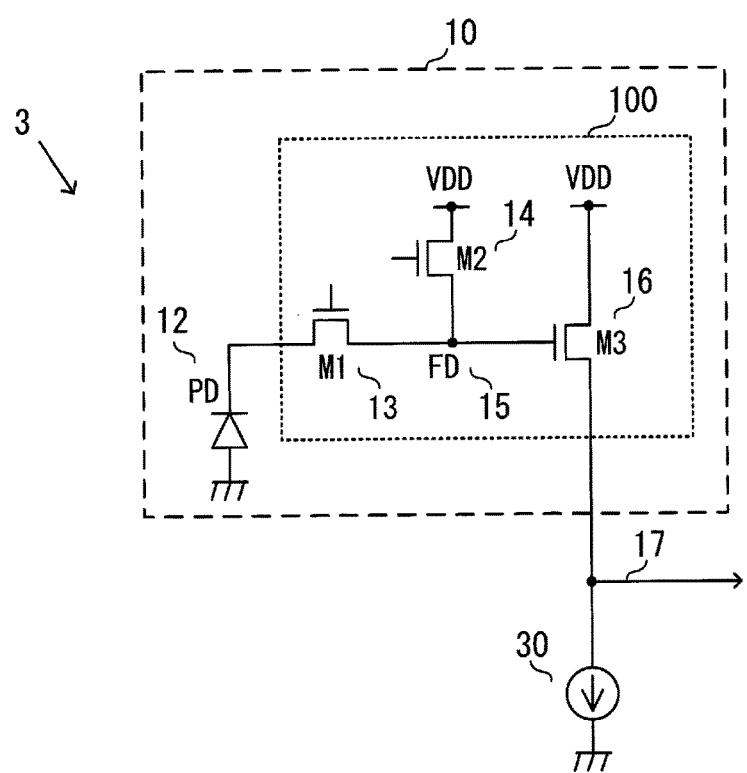
FIG. 3 is a block diagram illustrating a configuration of a pixel 10 according to the first embodiment.

FIG. 3 is a circuit diagram illustrating a configuration of the pixel 10 according to the first embodiment. The image sensor 3 has a plurality of pixels 10. The pixel 10 includes a photoelectric conversion unit 12 and a readout circuit 100. The photoelectric conversion units 12 are arranged in a matrix, for example, in an image-capturing region of the image sensor 3. The photoelectric conversion unit 12 has a photoelectric conversion function of converting incident light into an electric charge. The photoelectric conversion unit 12 accumulates the electric charge resulting from the photoelectric conversion. The photoelectric conversion unit 12 is constructed by a photodiode, for example. The readout circuit 100 reads out a pixel signal to the signal line 17, the pixel signal being generated by the electric charge resulting from the photoelectric conversion by the photoelectric conversion unit 12. The pixel signal constitutes image data, for example. The readout circuit 100 includes a transfer unit 13, a discharge unit 14, a floating diffusion 15, and an output unit 16.

The transfer unit 13 is driven by a transfer signal TX to transfer the electric charge photoelectrically converted by the photoelectric conversion unit 12 to the floating diffusion 15. In other words, the transfer unit 13 forms an electric charge transfer path between the photoelectric conversion unit 12 and the floating diffusion 15. The output unit 16 outputs a pixel signal to the signal line 17, the pixel signal being generated by the electric charge transferred by the transfer unit 13 from the photoelectric conversion unit 12 to the floating diffusion 15. The output unit 16 is a transistor having a drain terminal, a gate terminal, and a source terminal connected to the power supply VDD, the floating diffusion 15, and the signal line 17, respectively. The discharge unit 14 is driven by a reset signal RST to discharge the electric charge of the floating diffusion 15. The floating diffusion 15 is reset to a reference potential by discharging the electric charge with the discharge unit 14.

An electric current source 30 is connected to the readout circuit 100 via the signal line 17. The electric current source 30 supplies an electric current for causing the readout circuit 100 to read out the pixel signal generated by the electric charge resulting from the photoelectric conversion by the photoelectric conversion unit 12. Specifically, the electric current source 30 is a transistor having a drain terminal, a gate terminal, and a source terminal connected to the signal line 17, the electric current source circuit 50, and a ground (GND), respectively. The electric current source 30 supplies an electric current to the output unit 16 of the readout circuit 100. In other words, the output unit 16 constitutes a source follower circuit with the electric current source 30 as a load electric current source. The electric current source 30 generates an electric current to be supplied to the signal line 17 based on an electric current from the electric current source circuit 50. Additionally, the drain terminal and the gate terminal are connected to the electric current source 30.

The shooting operation, i.e., the exposure operation of the pixel 10 will now be described. In response to a shooting start signal, i.e., a release signal by the release operation member, the electric charge accumulation time control unit 111 sets the transfer signal TX and the reset signal RST to high level. A transfer transistor M1 and a reset transistor M2 are turned on to discharge and reset an electric charge of the photoelectric conversion unit 12 and an electric charge of the floating diffusion 15. When the electric charge accumulation time control unit 111 sets the transfer signal TX and the reset signal RST to low level (for example, the ground level) to terminate the resetting, the photoelectric conversion unit 12 starts accumulation of an electric charge depending on incident light. In other words, an exposure operation is started.

After a predetermined exposure time has elapsed, the electric charge accumulation time control unit 111 sets the transfer signal TX to high level (for example, the power supply VDD level). Responding to turning on of the transfer transistor M1, the electric charge accumulated in the photoelectric conversion unit 12 during the exposure time is transferred to the floating diffusion 15. A pixel signal generated by the electric charge transferred to the floating diffusion 15 is outputted to the signal line 17 by the output unit 16 and then converted into a digital signal by an analog/digital conversion circuit (not illustrated). In this way, the electric charge accumulation time control unit 111 controls the electric charge accumulation time of the pixel 10 with the transfer signal TX and the reset signal RST.

A comparator circuit constituting a part of the analog/digital conversion circuit outputs an output signal generated by comparing a pixel signal with a reference signal, to a latch circuit. The latch circuit holds a count value corresponding to the time elapsed since the start of the comparison, based on the output signal of the comparator circuit.

Figure 4:
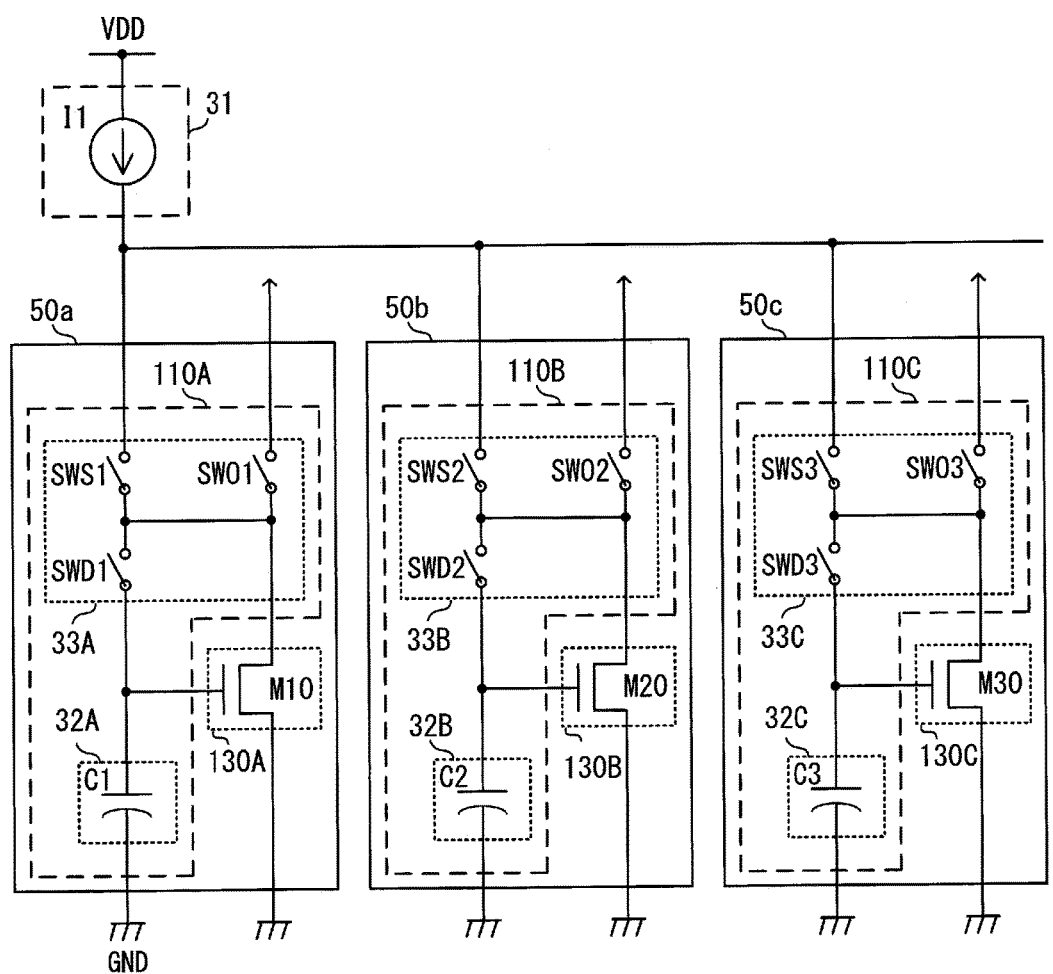
FIG. 4 is a circuit diagram illustrating a configuration of an electric current source circuit unit 120 according to the first embodiment.

FIG. 4 is a circuit diagram illustrating a configuration of the electric current source circuit unit 120 according to the first embodiment. In the configuration illustrated in FIG. 4 as an example, only three supply units 130 (supply units 130A to 130C) are illustrated for the sake of simplification.

The reference electric current source circuit 31 has the reference electric current source I1. The reference electric current source I1 is connected to the power supply VDD and outputs a reference electric current i1. The supply unit 130 outputs an electric current corresponding to the reference electric current i1 outputted from the reference electric current source I1.

A storage circuit 110 has a storage unit 32 and an adjustment unit 33. The storage circuit 110 (storage circuits 110A to 110C) stores a voltage based on the reference electric current i1 outputted from the reference electric current source I1 in the storage unit 32. The storage unit 32 is connected to a gate terminal of the supply unit 130 to supply the stored voltage to the supply unit 130.

The supply unit 130 generates an electric current based on the voltage stored in the storage unit 32. The storage unit 32 is constituted with a capacitive element such as a capacitor having one electrode connected to the gate terminal of the supply unit 130 and the other electrode connected to the ground, for example. In the example illustrated in FIG. 4, the storage units 32 (storage units 32A to 32C) include capacitors C1 to C3, respectively.

The adjustment unit 33 adjusts an electric current supplied from the reference electric current source circuit 31 to the storage unit 32. For example, if a voltage based on the electric current outputted from the reference electric current source I1 is to be stored in the storage unit 32A, the adjustment unit 33 adjusts electric currents supplied from the reference electric current source I1 to the storage units 32B and 32C to be smaller than an electric current supplied from the reference electric current source I1 to the storage unit 32A.

The adjustment unit 33 is constituted with switches that connect the reference electric current source circuit 31 and the storage unit 32, for example. The adjustment unit 33 (adjustment units 33A to 33C) includes a switch SWS (SWS1 to SWS3, respectively), a switch SWD (SWD1 to SWD3, respectively), and a switch SWO (SWO1 to SWO3, respectively).

Each of the switches SWS (SWS1 to SWS3), SWD (SWD1 to SWD3) and SWO (SWO1 to SWO3) is constituted with a transistor, for example. The switches SWS (SWS1 to SWS3), SWD (SWD1 to SWD3), and SWO (SWO1 to SWO3) are controlled by control signals outputted by the pixel control unit 11.

Figure 5:
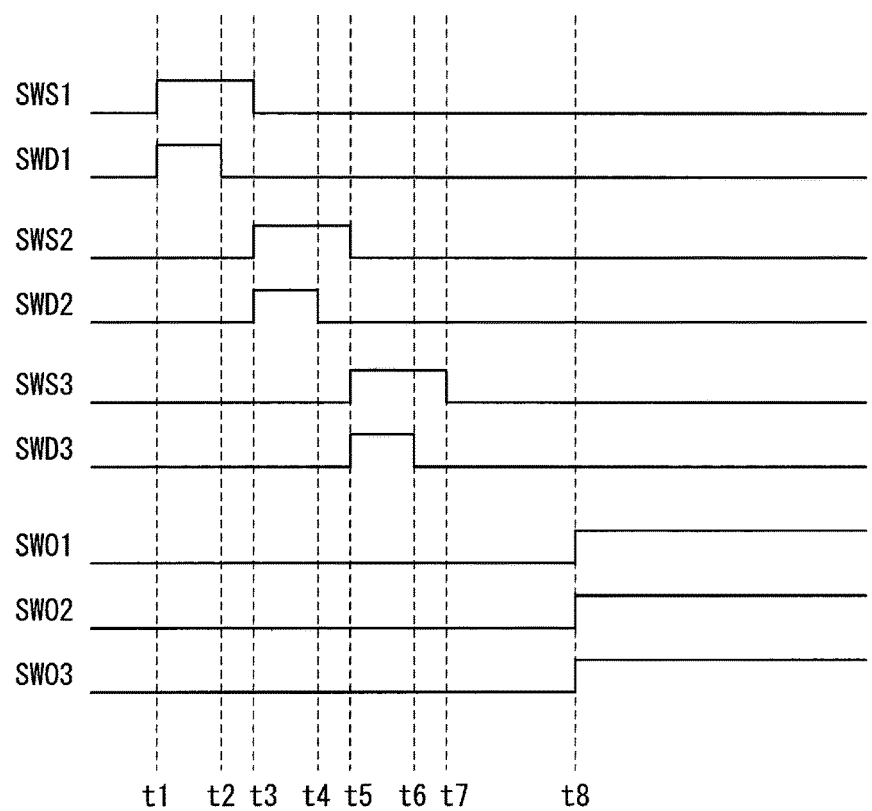
FIG. 5 is a timing chart illustrating an exemplary operation of the electric current source circuit unit 120 according to the first embodiment.

FIG. 5 is a timing chart illustrating an exemplary operation of the adjustment unit 33 according to the first embodiment. In FIG. 5, reference signs SWS1 to SWS3, SWD1 to SWD3, and SWO1 to SWO3 indicate control signals inputted to the switches SWS (SWS1 to SWS3), SWD (SWD1 to SWD3), and SWO (SWO1 to SWO3) from the pixel control unit 11. Additionally, the vertical axis indicates voltage level of the control signal outputted from the pixel control unit 11, and the horizontal axis indicates time. The switches SWS (SWS1 to SWS3), SWD (SWD1 to SWD3), and SWO (SWO1 to SWO3) are turned on if the input control signal is at high level and are turned off if the input control signal is at low level.

At a time t1, the switches SWS1 and SWD1 are turned to high level. Once the switch SWD1 is turned on, the gate terminal and the drain terminal of the supply unit 130A are connected. The supply unit 130A is thus diode-connected. Furthermore, once the switch SWS1 is turned on, the reference electric current source I1 is connected to the supply unit 130A and the storage unit 32A. This causes the reference electric current i1 to be supplied from the reference electric current source I1 to the supply unit 130A and the storage unit 32A.

A gate-source voltage Vgs of the supply unit 130A is a value based on the reference electric current i1 and a threshold voltage Vth1 of the supply unit 130A. A voltage Vg1 applied to the gate terminal of the supply unit 130A is a value depending on the gate-source voltage Vgs of the supply unit 130A and thus based on the reference electric current i1 and the threshold voltage Vth1 of the supply unit 130A. The voltage Vg1 is stored in the storage unit 32A by the reference electric current i1.

At a time t2, the switch SWD1 is turned to low level. Once the switch SWD1 is turned off, the reference electric current source I1 and the storage unit 32A are disconnected. The gate-source voltage Vgs of the supply unit 130A is stored in the storage unit 32A. Turning off the switch SWD1 prior to the switch SWS1 can prevent the voltage Vg1 stored in the storage unit 32A from dropping through the supply unit 130A.

At a time t3, the switch SWS1 is turned to low level. Once the switch SWS1 is turned off, the reference electric current source I1 and the supply unit 130A are disconnected. Likewise, once the switches SWS2 and SWD2 are turned on, the reference electric current source I1 is connected to the supply unit 130B and the storage unit 32B. This causes the reference electric current i1 to be supplied from the reference electric current source I1 to the supply unit 130B and the storage unit 32B. During a period between a time t4 and a time t5, the switches SWD2 and SWS2 are turned to low level. Once the switches SWD2 and SWS2 are turned off, the reference electric current source I1 and the storage unit 32B are disconnected. A gate-source voltage Vgs of the supply unit 130B is stored in the storage unit 32B.

At a time t5, the switches SWS3 and SWD3 are turned to high level. Once the switches SWS3 and SWD3 are turned on, the reference electric current source I1 is connected to the supply unit 130C and the storage unit 32C. This causes the reference electric current i1 to be supplied from the reference electric current source I1 to the supply unit 130C and the storage unit 32C. During a period between a time t6 and a time t7, the switches SWD3 and SWS3 are turned to low level. Once the switches SWD3 and SWS3 are turned off, the reference electric current source I1 and the storage unit 32C are disconnected. A gate-source voltage Vgs of the supply unit 130C is stored in the storage unit 32C.

At a time t8, the switches SWO1 to SWO3 are turned to high level. Once the switches SWO1 to SWO3 are turned on, the supply units 130A to 130C generate and output electric currents based on the voltages Vg1 to Vg3, respectively, applied to the gate terminals of the supply units.

FIG. 6(a) is a circuit diagram illustrating a part of a pixel circuit 150, the electric current source circuit 50, and the reference electric current source circuit 31 according to the first embodiment. FIG. 6(b) is a diagram illustrating a connection relationship between the part of the pixel circuits 150, the electric current source circuit 50, and the reference electric current source circuit 31 according to the first embodiment.

An example illustrated in FIG. 6(b) includes pixel circuits 150 constituting eight rows and ten columns. Each pixel circuit 150 includes a pixel 10, an electric current source 30 arranged for the individual pixel 10, a second storage unit 132 that stores a voltage based on an electric current from the electric current source circuit 50, a switch SWS2, a switch SWD2, and a switch SWO2. The number of the pixel circuits 150 is the same as the number of the pixels 10 of the image sensor 3. The number of the current source circuits 50 is the same as the number of columns of the pixel circuits 150 of the image sensor 3. Since the pixel circuits 150 constitute ten columns in FIG. 6(b), ten electric current source circuits 50 (electric current source circuits 50a to 50j) are accordingly illustrated in the figure. It should be noted that the adjustment unit 33 may include the switches SWD1, SWO1, SWS2, SWD2, and SWO2. Furthermore, the storage circuit 110 may include a first storage unit (also referred to as a first holding circuit) 32, a second storage unit (also referred to as a second holding circuit) 132, an adjustment unit 33, and a supply unit 130.

The connection relationship between the electric current source circuits 50 and the pixel circuits 150 will now be described. In FIG. 6(b), the electric current source circuit 50a located at the leftmost is connected to each of a plurality of pixel circuits 150a1, 150a2, 150a3, 150a4, 150a5, 150a6, 150a7, and 150a8 located at the leftmost. In other words, the leftmost electric current source circuit 50a is connected to each of the plurality of pixel circuits 150 in the leftmost column. Likewise, an electric current source circuit 50b next to the electric current source circuit 50a in the leftmost column is connected to each of a plurality of pixel circuits of 150b1 to 150b8, which are respectively next to each of the pixel circuits, 150a1 to 150a8 in the leftmost column. Likewise, finally, the electric current source circuit 50j located at the rightmost is connected to each of a plurality of pixel circuits, 150j1, 150j2, 150j3, 150j4, 150j5, 150j6, 150j7, 150j8, in the rightmost column.

Figure 6:
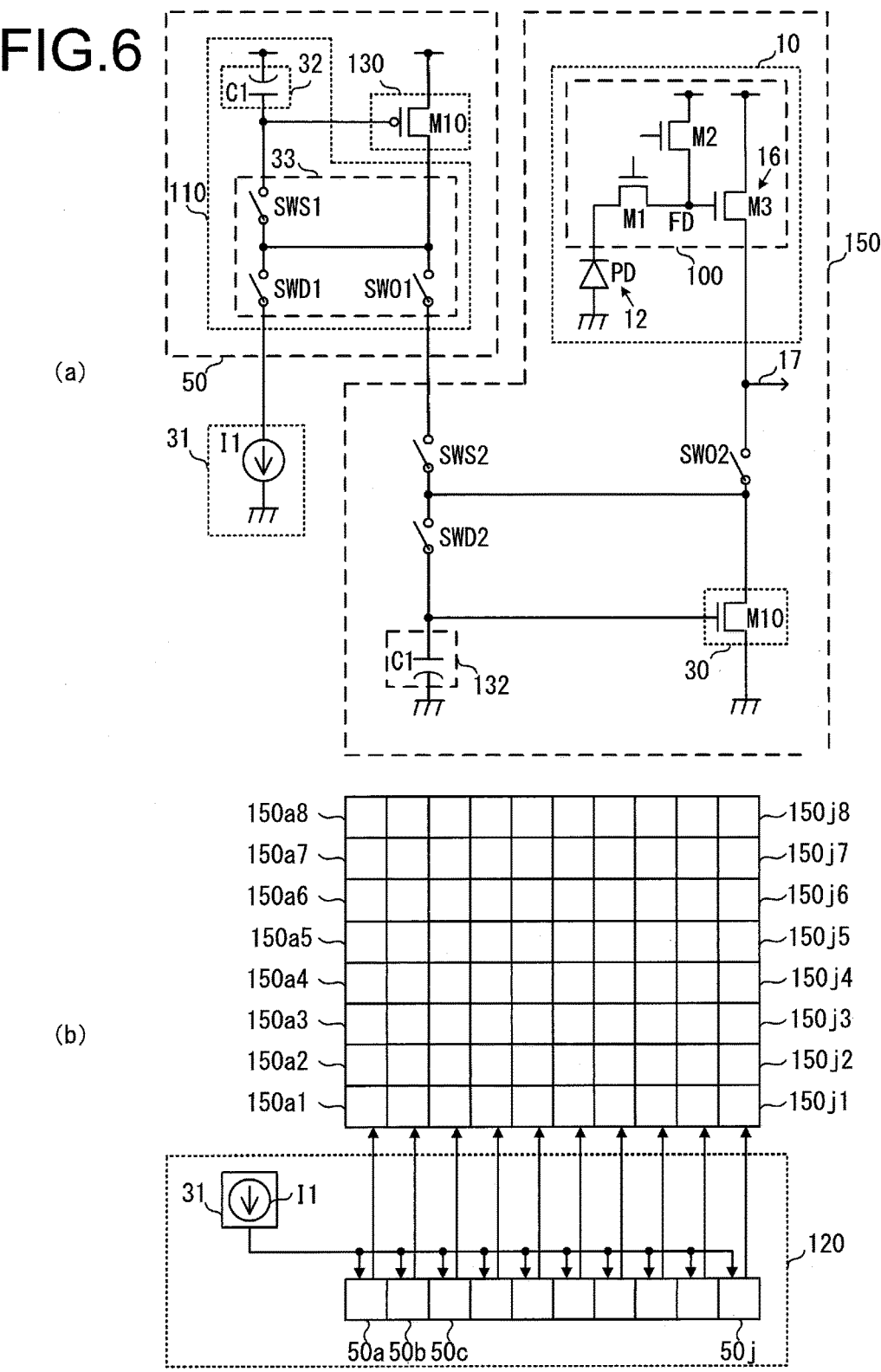
FIG. 6(a) is a view illustrating a part of a pixel circuit 150, a part of an electric current source circuit 50, and a reference electric current source circuit 31 according to the first embodiment.
FIG. 6(b) is a view illustrating a connection relationship of a part of the pixel circuit 150, a part of the electric current source circuit 50, and the reference electric current source circuit 31 according to the first embodiment.

Connection of the electric current source circuit 50 and the pixel circuit 150 is performed by connecting the switch SWS2 of the pixel circuit 150 and the switch SWO1 of the electric current source circuit 50 as illustrated in FIG. 6(*a*). With this connection, the capacitor C1 of the second storage unit 132 of the pixel circuit 150 is connected to the supply unit 130 of the electric current source circuit 50 via the switches SWD2, SWS2 and the switch SWO1.

For the plurality of electric current source circuits 50 illustrated in FIG. 6(*b*), capacitors C1 of the first storage units 32 are charged by the reference electric current i1 from the reference electric current source I1, sequentially in the direction from the electric current source circuit 50*a* at the leftmost to the electric current source circuit 50*j* at the rightmost, for example. The capacitor C1 is charged by on/off control of the switches SWS1 and SWD1. The on/off control of the switches SWS1 and SWD1 is performed in the same manner as the on/off control illustrated in FIG. 5 that shows the control of the switches SWS1 and SWD1, the on/off control of the switches SWS2 and SWD2, the on/off control of the switches SWS3 and SWD3.

The charging of the capacitor C1 described above allows a voltage based on the reference electric current i1 to be stored (held) in the first storage unit 32. After the completion of storage of the voltages based on the reference electric current i1 in all the electric current source circuits, 50*a* to 50*j*, the switches SWO1 of all the electric current source circuits, 50*a* to 50*j*, are simultaneously turned on in the same manner as the switches SWO1 to SWO3 illustrated in FIG. 5. With the switches SWO1, the supply units 130 for all the electric current source circuits, 50*a* to 50*j*, are ready to supply the pixel circuits, 150*a* to 150*j*, with electric currents based on the reference electric current i1. The supply unit 130 supplies the electric current generated by the voltage stored in the first storage unit 32. The electric current from the electric current source circuit 50 is the same or substantially the same as the reference electric current i1 from the reference electric current source I1. In this manner, each electric current source circuit, 50*a* to 50*j*, can generate an electric current based on the reference electric current i1 of the reference electric current source I1 and supply it to the corresponding pixel circuit, 150*a* to 150*j*.

Then, all the switches SWS2, SWD2 of the plurality of pixel circuits, 150*a*1 to 150*j*1, in the lowermost row are simultaneously turned on. Once the switches are turned on in such a manner, the capacitors C1 of the second storage units 132 are simultaneously charged by electric currents from the supply units 130 of the current source circuits, 50*a* to 50*j*, in the plurality of pixel circuits, 150*a*1 to 150*j*1, in the lowermost row, to store (hold) voltages in the second storage units 132. In this way, voltages based on the electric currents from the plurality of electric current source circuits, 50*a* to 50*j*, are simultaneously stored in the second storage units 132 of the plurality of pixel circuits, 150*a*1 to 150*j*1, in the lowermost row.

Thereafter, the switches SWS2 and SWD2 are simultaneously turned on in all of the plurality of pixel circuits, 150*a*2 to 150*j*2, in a second row from the bottom, so that voltages are simultaneously stored in the second storage units 132 by electric currents of individual current source circuits, 50*a* to 50*j*. Likewise, finally, voltages based on the electric currents from the electric current source circuits, 50*a* to 50*j*, are simultaneously stored in the second storage units 132 of the plurality of pixel circuits, 150*a*8 to 150*j*8, in the uppermost row. The second storage unit 132 supplies the stored voltage (hereinafter referred to as a bias voltage) to the electric current source 30. Once the switch SWO2 is turned on after the voltage is stored in the second storage unit 132, the electric current source 30 supplies the signal line 17 with an electric current based on the bias voltage stored in the second storage unit 132.

In this way, the electric current source circuits, 50*a* to 50*j*, store the bias voltages of the electric current sources 30 in the second storage units 132 of the pixel circuits 150 simultaneously for each row, up to the uppermost row, so that the bias voltages are preset for all pixel circuits 150.

In response to the release operation member starting the release operation, the bias voltage preset unit 112 drives the electric current source circuit unit 120 as described above before the start of the exposure operation so that the bias voltages of the electric current sources 30 of all pixel circuits 150 are initialized, i.e., the bias voltages are preset (hereinafter referred to as a full pixel bias voltage presetting).

During the exposure operation, the bias voltage refresh unit 113 resets (i.e., refreshes) the bias voltage preset by the bias voltage preset unit 112 (hereinafter referred to as a bias voltage refreshing). It should be noted that the refreshing operation compensates for fluctuations in the preset bias voltage due to a leak electric current of the capacitor C1 of the second storage unit 132, or the like. Since the refreshing operation is designed to compensate for the fluctuations in the bias voltage, the refreshing operation can be performed in a shorter time than the time required for a refreshing operation at the time of presetting.

Figure 7:
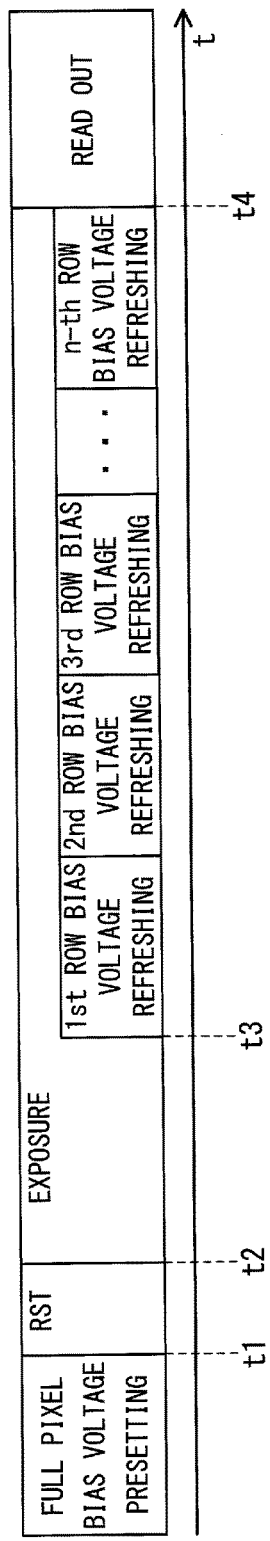
FIG. 7 is a timing chart illustrating an exemplary operation during long shooting of the image-capturing device 1 according to the first embodiment.

Next, the long shooting operation by the image-capturing device 1 according to the present embodiment will be described. The long exposure setting unit 6 sets a long shooting of about 5 seconds, for example, by the automatic exposure calculation unit or the manual long exposure setting unit. FIG. 7 is a timing chart illustrating an exemplary operation of the long shooting of the image-capturing device 1 according to the first embodiment. In response to the release operation by the release operation member, the electric current source circuits, 50*a* to 50*j*, are sequentially supplied with the reference electric current i1 from the reference electric current source I1 to store voltages based on the reference electric current i1. The electric current source circuits, 50*a* to 50*j*, are ready to supply electric currents based on the reference electric current i1.

An initial setting is performed in which the pixel circuits 150 are supplied with electric currents from the electric current source circuits, 50*a* to 50*j*, on a row basis to sequentially store the bias voltages on a row basis. After the completion of the storage of the bias voltages in all the pixel circuits 150, i.e., the full pixel bias voltage presetting, the pixel control unit 11 turns on the reset transistor M2 and the transfer transistor M1 with the reset signal RST and the transfer signal TX at a time t1 illustrated in FIG. 7 to reset electric charges of the photodiode and the floating diffusion 15 of each pixel 10. At a time t2, the pixel control unit 11 terminates the resetting and starts the exposure operation, that is, the electric charge accumulation in the photodiode.

The bias voltage refresh unit 113 calculates an exposure end time, i.e., a pixel signal readout start time, based on the exposure period and the exposure start time. The bias voltage refresh unit 113 calculates a required refreshing time of all the pixel circuits 150 based on the refreshing time for each row of the pixel circuits 150 and the total number of rows of the pixel circuits 150. The bias voltage refresh unit 113 further calculates a refreshing start time based on the pixel signal readout start time and the required refreshing time. The bias voltage refresh unit 113 generates a refresh timing signal that completes a bias voltage refreshing of all the pixel circuits 150 immediately before the start of the pixel signal readout, based on the refreshing start time.

At a time t3, during the exposure operation, the pixel control unit 11 outputs a control signal that drives the switches SWS, SWD, SWO of each electric current source circuit 50 and pixel circuit 150 based on the refresh timing signal. Each electric current source circuit 50 sequentially performs the bias voltage refreshing for each row of the pixel circuits 150. The pixel control unit 11 causes the electric current source circuit unit 120 to complete the refreshing of the bias voltages of all the pixel circuits 150 immediately before the start of the pixel signal readout. At a time t4, the pixel control unit 11 reads out the electric charge accumulated in the photodiode of each pixel 10, with the transfer signal TX.

If the exposure end time is determined in advance, such as if the exposure period is automatically set based on a subject luminance or if the exposure period is set by a manual operation, a refreshing operation is performed so that the refreshing of all the pixel circuits 150 is completed immediately before the pixel signal readout. The pixel signal readout is performed based on an electric current depending on the last refreshed bias voltage, so that an accuracy of the pixel signal readout can be improved.

Figure 8:
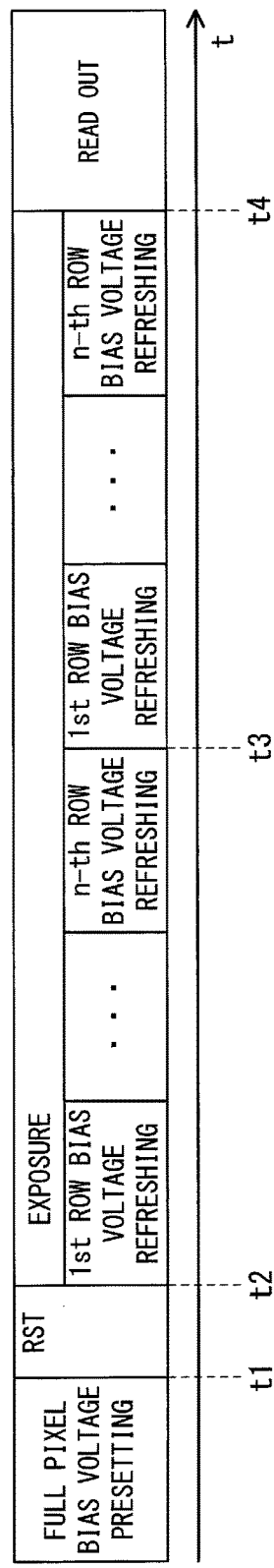
FIG. 8 is a timing chart illustrating another exemplary operation during long shooting of the image-capturing device 1 according to the first embodiment.

FIG. 8 is a timing chart illustrating another exemplary operation during long shooting of the image-capturing device 1 according to the first embodiment. The time shooting setting unit or the bulb shooting setting unit of the long exposure setting unit 6 sets a long shooting. In the example illustrated in FIG. 8, it is described an exemplary operation of the image-capturing device 1 in which a photographer determines an exposure end time during an exposure operation. In the example illustrated in FIG. 8, a refreshing operation is performed for each row in response to the start of electric charge accumulation by the pixel 10. Once the refreshing operation is completed for all rows, another refreshing operation for each row is performed.

In FIG. 8, after the full pixel bias voltage presetting, the pixel control unit 11 resets the electric charge of the photodiode of each pixel 10 at a time t1. At a time t2, the pixel control unit 11 releases the resetting to start accumulation of an electric charge depending on incident light in each pixel 10.

In the example illustrated in FIG. 8, the bias voltage refresh unit 113 sequentially selects the rows of the pixel circuits 150 based on the exposure start time. After the bias voltage refresh unit 113 selects the uppermost row, it generates a refresh timing signal for returning to the first row to repeat the refreshing operation. At a time t2, the pixel control unit 11 outputs a control signal based on the refresh timing signal so that the bias voltage refreshing is sequentially performed for each row of the pixel circuits 150.

When the refreshing operation is completed for all rows of pixel circuits 150 at a time t3, the pixel control unit 11 starts the refreshing operation again from the first row. At a time t4, in response to the exposure end time being determined by the photographer, the pixel control unit 11 terminates the refreshing operation and then reads out the electric charge accumulated in the photodiode of each pixel 10.

In the above embodiment, the electric current source is illustrated as an electric current source of the pixel signal readout circuit 100 included in the image sensor 3. However, the present invention is not limited to this. The electric current source 30 is also applicable as an electric current source for a comparator circuit of an analog/digital conversion circuit that converts a pixel signal into a digital signal and an electric current source for other source follower circuits in addition to the electronic circuits included in the image sensor 3. The electric current source 30 is further applicable to electronic circuits other than the source follower circuits.

According to the above embodiment, the following advantageous effects can be achieved.

(1) The image sensor 3 comprises: the first readout circuit 100 that reads out the first signal generated by the electric charge resulting from the photoelectric conversion to the first signal line 17; the first storage circuit 110 that stores the voltage based on the electric current i1 from the reference electric current source I1; and the first electric current source 30 that supplies the first signal line 17 with the electric current generated by the voltage stored in the first storage circuit 110, wherein: the first storage circuit 110 stores the voltage based on the electric current i1 from the reference electric current source I1 when the first signal is not read out to the first signal line 17 by the first readout circuit 100. In this way, the voltage can be stored in the first storage circuit 110 in accordance with the pixel signal readout timing. Additionally, since the pixel signal readout is performed based on the electric current generated by the voltage stored immediately before the readout, the accuracy of the pixel signal readout can be improved.

Second Embodiment

Figure 9:
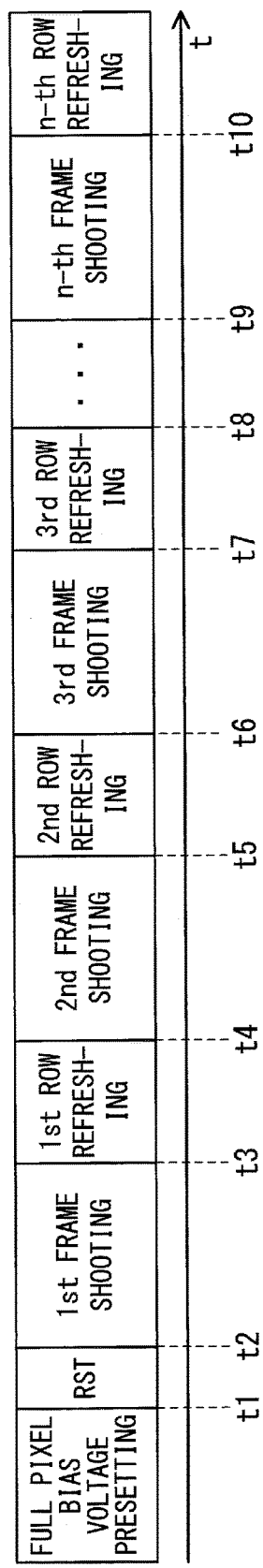
FIG. 9 is a timing chart illustrating an exemplary operation during continuous shooting of the image-capturing device 1 according to a second embodiment.

A second embodiment illustrates an exemplary refreshing operation of a bias voltage in which continuous shooting (continuous photographing) is performed with the image-capturing device 1. The image-capturing device 1 according to the second embodiment is the image-capturing device 1 according to the first embodiment in FIG. 1 additionally having a continuous shooting setting unit 7 that sets a continuous shooting mode. FIG. 9 is a timing chart illustrating an exemplary operation during continuous shooting of the image-capturing device 1 according to the second embodiment. In an example illustrated in FIG. 9, the bias voltage of each pixel circuit 150 is refreshed on a row basis for each frame shooting when the continuous shooting setting unit 7 sets the continuous shooting mode based on the operation signal of the operation member, or the like.

An exemplary operation of the image-capturing device 1 according to the second embodiment illustrated in FIG. 9 will now be described. When the release operation member is operated to output a release signal after the continuous shooting setting unit 7 sets the continuous shooting mode, the bias voltage preset unit 112 initializes, i.e., presets, the bias voltages of all the pixel circuits 150 in response to the release signal, as illustrated in FIG. 9, in the same manner as in the first embodiment. After the presetting of the bias voltages of all the pixel circuits 150 is completed, the pixel control unit 11 resets both the electric charge of the photoelectric conversion unit 12 and the electric charge of the floating diffusion 15 of each pixel 10 at a time t1. Then, during a period between a time t2 and a time t3, the pixel control unit 11 performs a shooting operation of the first frame, that is, the exposure (electric charge accumulation) operation and the pixel signal readout operation.

After the completion of a shooting of the first frame, the refreshing operation of the bias voltages of the pixel circuits, 150a1 to 150j1, in a first row is performed between a shooting end time of the first frame t3 and a shooting start time of the second frame t4. Likewise, the refreshing operation of the bias voltages of the pixel circuits, 150a2 to 150j2, in a second row is performed during a period between a time t5 to a time t6 corresponding to a period between a shooting of the second frame and a shooting of the third frame, and the refreshing operation of the bias voltages of the pixel circuits, 150a3 to 150j3, in a third row is performed during a period between a time t7 and a time t8 corresponding to a period between a shooting of the third frame and a shooting of the fourth frame. In this way, the refreshing operation of the bias voltages of the pixel circuits 150 for each row is performed until the end of the continuous shooting, during intervals between the shooting operations of consecutive frames in the continuous shooting.

Figure 10:
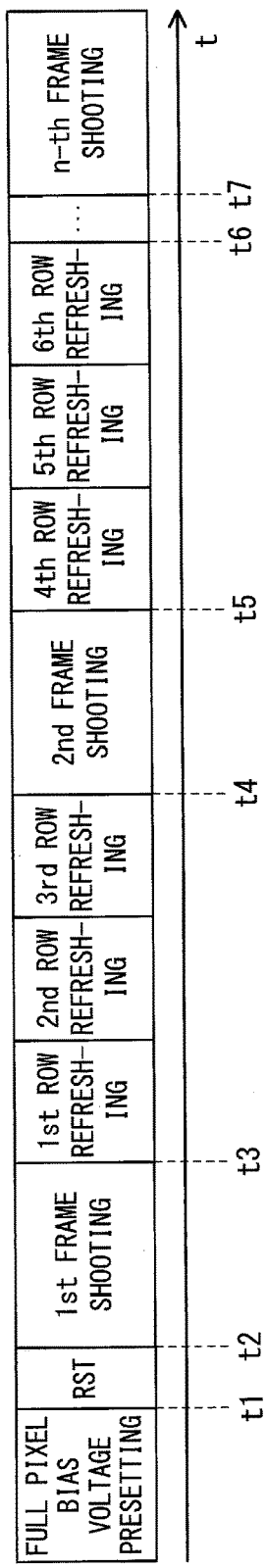
FIG. 10 is a timing chart illustrating another exemplary operation during continuous shooting of the image-capturing device 1 according to the second embodiment.

FIG. 10 is a timing chart illustrating another exemplary operation during continuous shooting of the image-capturing device 1 according to the second embodiment. In an example illustrated in FIG. 10, the bias voltages of three rows of the pixel circuits 150 are refreshed for each frame shooting when the continuous shooting setting unit 7 sets the continuous shooting mode.

An exemplary operation of the image-capturing device 1 illustrated in FIG. 10 will now be described. The bias voltage preset unit 2 presets the bias voltages of all the pixel circuits 150 in response to the release signal, in the same manner as in the first embodiment. After the presetting of the bias voltages of all the pixel circuits 150 is completed, the pixel control unit 11 resets both the electric charge of the photoelectric conversion unit 12 and the electric charge of the floating diffusion 15 of each pixel 10 at a time t1. Then, during a period between a time t2 and a time t3, the pixel control unit 11 performs a shooting operation of the first frame.

After the completion of the shooting of the first frame, the refreshing operation of the bias voltages of the pixel circuits, 150a1 to 150j1, in a first row, the pixel circuits, 150a2 to 150j2, in a second row, and the pixel circuits, 150a3 to 150j3, in a third row is performed between a shooting end time of the first frame t3 and a shooting start time of the second frame t4. Likewise, the refreshing operation of the bias voltages of the pixel circuits, 150a4 to 150j4, in a fourth row, the pixel circuits, 150a5 to 150j5, in a fifth row, and the pixel circuits, 150a6 to 150j6, in a sixth row is performed during a period between a time t5 and a time t6 corresponding to a period between a shooting of the second frame and a shooting of the third frame. In this way, a refreshing operation of the bias voltages of the pixel circuits 150 for every plural rows is performed during intervals between the shooting operations of consecutive frames in the continuous shooting, until the end of the continuous shooting.

Figure 11:
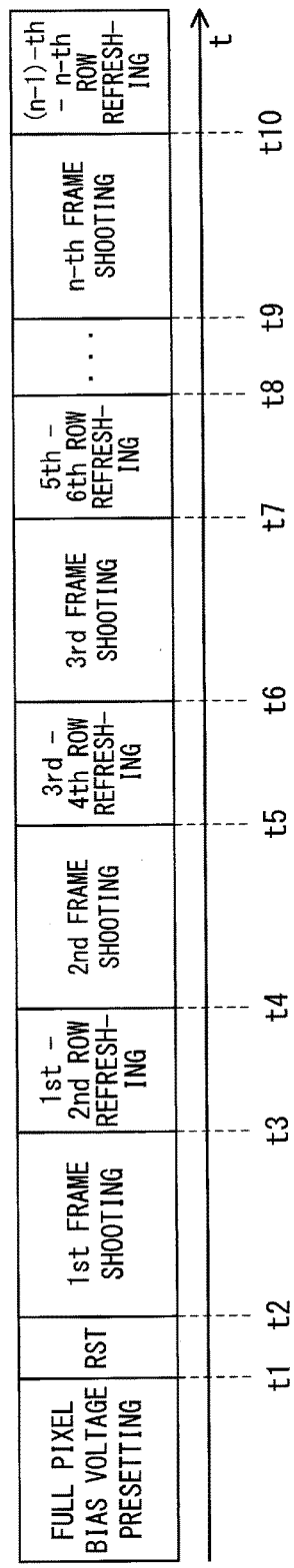
FIG. 11 is a timing chart illustrating another exemplary operation during continuous shooting of the image-capturing device 1 according to the second embodiment.

FIG. 11 is a timing chart illustrating further exemplary operation during continuous shooting of the image-capturing device 1 according to the second embodiment. In an example illustrated in FIG. 11, the bias voltages of two rows of the pixel circuits 150 are simultaneously refreshed for each frame shooting. In the first embodiment, it has been explained an example in which as many electric current source circuits 50 as columns of the pixel circuits 150 are provided. By contrast, in the example illustrated in FIG. 11, the electric current source circuits 50 corresponding to a plurality of rows of the pixel circuits 150 are provided. By providing a plurality of electric current source circuits 50, each corresponding to a plurality of rows (for example, two rows) of the pixel circuits 150, bias voltages are simultaneously set for a plurality of rows of the pixel circuits 150.

Another exemplary operation of the image-capturing device 1 according to the second embodiment illustrated in FIG. 11 will now be described. The bias voltage preset unit 112 presets the bias voltages of all the pixel circuits 150 in response to the release signal, in the same manner as in the first embodiment. After the presetting of the bias voltages of all the pixel circuits 150 is completed, the pixel control unit 11 resets both the electric charge of the photoelectric conversion unit 12 and the electric charge of the floating diffusion 15 of each pixel 10 at a time t1. Then, during a period between a time t2 and a time t3, the pixel control unit 11 performs a shooting operation of the first frame.

After the completion of the shooting of the first frame, the refreshing operation of the bias voltages of the pixel circuits, 150a1 to 150j1, in a first row and the refreshing operation of the bias voltages of the pixel circuits, 150a2 to 150j2, in a second row are simultaneously performed between a shooting end time of the first frame t3 and a shooting start time of the second frame t4. Likewise, the refreshing operation of the bias voltages of the pixel circuits, 150a3 to 150j3, in a third row and the refreshing operation of the bias voltages of the pixel circuits, 150a4 to 150j4, in a fourth row are simultaneously performed during a period between a time t5 and a time t6 corresponding a period between a shooting of the second frame and a shooting of the third frame. In this way, a refreshing operation of the bias voltages of the pixel circuits 150 for every plural rows is performed during intervals between the shooting operations of consecutive frames in the continuous shooting, until the end of the continuous shooting.

In the above embodiment, the electric current source is illustrated as an electric current source of the pixel signal readout circuit 100 included in the image sensor 3. However, the present invention is not limited to this. The electric current source 30 is also applicable as an electric current source for the comparator circuit of an analog/digital conversion circuit that converts a pixel signal into a digital signal and an electric current source for other source follower circuits in addition to the electronic circuits included in the image sensor 3. The electric current source 30 is further applicable to electronic circuits other than the source follower circuits.

According to the above embodiment, the following advantageous effect can be achieved in addition to the same advantageous effect as that of the first embodiment.

(2) The image-capturing device 1 includes the continuous shooting setting unit 7 that sets the continuous shooting mode. In this way, when the continuous shooting setting unit 7 sets the continuous shooting mode, voltages can be stored in the plurality of storage circuits 110 during an interval between consecutive shootings.

Third Embodiment

In the image sensor 3 of the image-capturing device 1 according to the first and second embodiments described above, the exposure time, i.e., the electric charge accumulation time in one shooting operation is the same for all the pixels 10. The image-capturing device 1 according to a third embodiment includes an image sensor 3 that can vary the exposure time, i.e., the electric charge accumulation time for each pixel 10 in one shooting operation. Other configurations of the image-capturing device 1 according to the third embodiment are the same as those of the first and second embodiments.

The image-capturing device 1 according to the third embodiment has the image sensor 3 illustrated in FIGS. 1 and 2, and the image sensor 3 has a plurality of pixels 10 having an electric charge accumulation time that can vary from one pixel 10 to another. Such variations in the electric charge accumulation time from one pixel 10 to another are achieved by the electric charge accumulation time control unit 111. The image sensor that can vary the electric charge accumulation time from one pixel 10 to another is known from International Publication WO 13/164915. Thus, illustration and description of a specific configuration of the pixels and the electric charge accumulation time control unit will be omitted.

In the image sensor 3, the electric charge accumulation time can be varied from one pixel 10 to another in one shooting operation as described above. However, for the sake of simplification, it is assumed that all the pixels of the image sensor 3 are divided into three pixel groups in the following description. It is assumed that the electric charge accumulation time of a first pixel group is controlled to be a first time, the electric charge accumulation time of a second pixel group is controlled to be a second time, and the electric charge accumulation time of a third pixel group is controlled to be a third time.

In the image sensor 3, the time from the start of the bias voltage presetting operation to the start of the pixel signal readout operation is the same for all the pixels 10.

The shooting operation of the image-capturing device 1 according to the third embodiment will now be described. In the image sensor 3, if the first pixel group captures an image of a low luminance part of a subject image, the second pixel group captures an image of an intermediate luminance part of the subject, and the third pixel group captures an image of a high luminance part of the subject image, for example, the first pixel group is set to a first electric charge accumulation time that is relatively long, the second pixel group is set to a second electric charge accumulation time that is shorter than the first electric charge accumulation time, and the third pixel group is set to a third electric charge accumulation time that is shorter than the second electric charge accumulation time.

Figure 12:
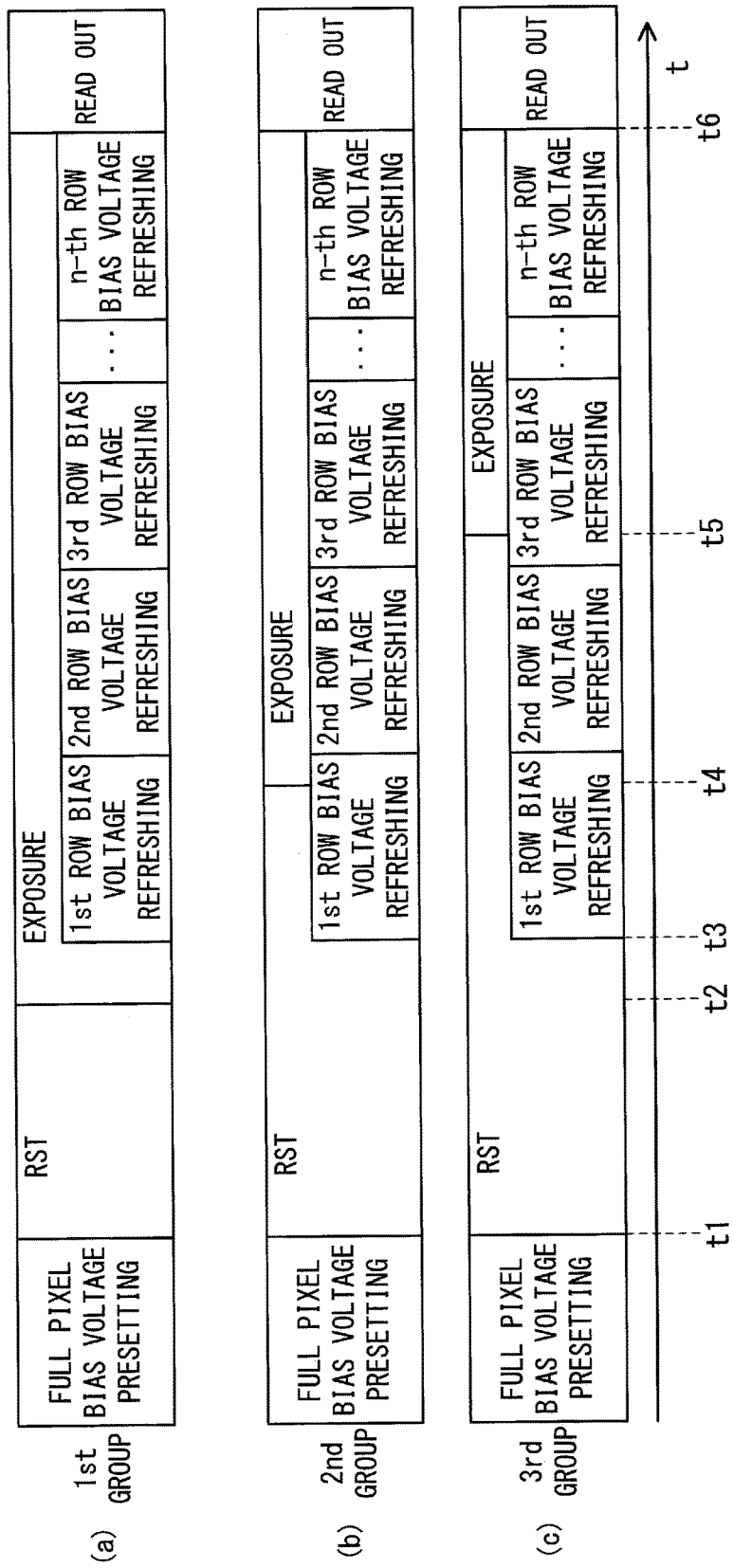
FIG. 12 is a timing chart illustrating an exemplary operation of the image-capturing device 1 according to a third embodiment.

When the release operation member is operated to output a release signal, the bias voltage preset unit 112 presets the bias voltages of all the pixel circuits 150, i.e., the first to third pixel groups, in response to the release signal, as illustrated in FIGS. 12(a) to 12(c), in the same manner as in the first embodiment. It should be noted that FIG. 12(a) is a timing chart illustrating the readout operation from the bias voltage preset operation of the first pixel group, FIG. 12(b) is a timing chart illustrating the readout operation from the bias voltage preset operation of the second pixel group, and FIG. 12(c) is a timing chart illustrating the readout operation from the bias voltage preset operation of the third pixel group.

After the presetting of the bias voltages in the first to third pixel groups is completed, the pixel control unit 11 resets both the electric charge of the photoelectric conversion unit 12 and the electric charge of the floating diffusion 15 of each pixel 10 at a time t1.

In the first pixel group, as illustrated in FIG. 12(a), the resetting is terminated and an exposure operation, i.e., an electric charge accumulation by the photodiode is started at a time t2. In the same manner as in the first embodiment, the bias voltage refresh unit 113 of the first pixel group calculates a pixel signal readout start time and a required refreshing time and also calculates a refresh start time based on the pixel signal readout start time and the required refreshing time. Based on the refresh start time, the bias voltage refresh unit 113 causes the bias voltage refreshing of all the pixel circuits 150 to be completed by a point in time immediately before the start of the pixel signal readout. At a time t6, the pixel signal readout operation is performed.

In the second pixel group, as illustrated in FIG. 12(b), the resetting is terminated and an exposure operation, i.e., an electric charge accumulation by the photodiode is started at a time t4. In the same manner as in the first group, the bias voltage refresh unit 113 of the second pixel group calculates the refresh start time based on the pixel signal readout start time and the required refreshing time. Based on the refresh start time, the bias voltage refresh unit 113 further causes the bias voltage refreshing of all the pixel circuits 150 to be completed by a point in time immediately before the start of the pixel signal readout. At a time t6, the pixel signal readout operation is performed.

In the third pixel group, as illustrated in FIG. 12(c), the resetting is terminated and an exposure operation, i.e., an electric charge accumulation by the photodiode is started at a time t5. In the same manner as in the first and second groups, the bias voltage refresh unit 113 of the third pixel group calculates the refresh start time based on the pixel signal readout start time and the required refreshing time. Based on the refresh start time, the bias voltage refresh unit 113 further causes the bias voltage refreshing of all the pixel circuits 150 to be completed by a point in time immediately before the start of the pixel signal readout. In the first to third pixel groups, the pixel signal readout operation is performed at a time t6.

According to the above embodiment, the following advantageous effect can be achieved in addition to the same advantageous effects as those of the first embodiment.

(3) The plurality of photoelectric conversion units 12 vary charge accumulation times. In this way, it is possible to individually set the electric charge accumulation time of each photoelectric conversion unit 12 and also to cause each storage circuit 110 to store a voltage in accordance with the pixel signal readout timing.

The following variation is also within the scope of the present invention, and one or more variations may be combined with the above embodiments.

First Variation

The image sensor 3 may be formed in one single semiconductor substrate or in a plurality of semiconductor substrates stacked together. The image sensor 3 includes a first semiconductor substrate provided with a readout circuit 100 and a second semiconductor substrate provided with a latch circuit, for example.

In the above embodiments and variation, the electric current source is illustrated as an electric current source of the pixel signal readout circuit 100 included in the image sensor 3. However, the present invention is not limited to this. The electric current source 30 is also applicable as an electric current source for the comparator circuit of the analog/digital conversion circuit that converts a pixel signal into a digital signal and an electric current source for other source follower circuits in addition to the electronic circuits included in the image sensor 3. The electric current source 30 is further applicable to electronic circuits other than the source follower circuits.

While various embodiments and variation have been described above, the present invention is not limited to these. Other aspects contemplated within the technical idea of the present invention are also included within the scope of the present invention.

The embodiments and variation described above also include the following image sensors and image-capturing devices.

(1) An image sensor, comprising: a first readout circuit that reads out a first signal, being generated by an electric charge resulting from a photoelectric conversion, to a first signal line; a first holding circuit that holds a voltage based on an electric current from a power supply circuit; and a first electric current source that supplies the first signal line with an electric current generated by the voltage held in the first holding circuit, wherein: the first holding circuit holds the voltage based on the electric current from the power supply circuit when the first signal is not read out to the first signal line by the first readout circuit.

(2) In the image sensor as recited in (1), the first readout circuit further comprises a first photoelectric conversion unit that accumulates the electric charge resulting from the photoelectric conversion; and the first holding circuit holds the voltage based on the electric current from the power supply circuit when the electric charge is accumulated by the first photoelectric conversion unit.

(3) In the image sensor as recited in (2), the image sensor further comprises: a second readout circuit that reads out a second signal, being generated by an electric charge resulting from a photoelectric conversion, to a second signal line; a second holding circuit that holds a voltage based on an electric current from the power supply circuit; and a second electric current source that supplies the second signal line with an electric current generated by the voltage held in the second holding circuit, wherein: the second holding circuit holds the voltage based on the electric current from the power supply circuit when the second signal is not read out to the second signal line by the second readout circuit.

(4) In the image sensor as recited in (3), the first holding circuit and the second holding circuit respectively hold the voltages based on the electric current from the power supply circuit in different timing to each other.

(5) In the image sensor as recited in (3) or (4), the second readout circuit includes a second photoelectric conversion unit that accumulates the electric charge resulting from the photoelectric conversion, and the second holding circuit holds a voltage based on an electric current from the power supply circuit when the electric charge is accumulated by the second photoelectric conversion unit.

(6) In the image sensor as recited in (5), the first holding circuit and the second holding circuit hold the voltages based on the electric current from the power supply circuit before the electric charge accumulation of the first photoelectric conversion unit and the second photoelectric conversion unit is completed.

(7) In the image sensor as recited in (6), the first photoelectric conversion unit and the second photoelectric conversion unit have different electric charge accumulation times.

(8) In the image sensor as recited in (3) to (7), the image sensor further comprises: a first comparator circuit of an analog/digital conversion circuit that converts the first signal read out to the first signal line by the first readout circuit into a digital signal, the first comparator circuit being connected to the first signal line and having an input part for inputting the first signal; a first latch circuit that stores the first signal converted into a digital signal as an output result of the first comparator circuit; a second comparator circuit of an analog/digital conversion circuit that converts the second signal read out to the second signal line by the second readout circuit into a digital signal, the second comparator circuit being connected to the second signal line and having an input part for inputting the second signal; and a second latch circuit that stores the second signal converted into a digital signal as an output result of the second comparator circuit, wherein: the first latch circuit and the second latch circuit are provided on a second semiconductor substrate that is different from the first semiconductor substrate provided with the first readout circuit and the second readout circuit.

(9) The image sensor as recited in (8), the first semiconductor substrate is stacked with the second semiconductor substrate.

(10) An image-capturing device comprising the image sensor as recited in (1) to (9).

Additionally, the embodiments and variations described above also include the following image sensors and image-capturing devices.

(1) An image sensor, comprising: a first readout circuit that reads out a first signal, being generated by an electric charge resulting from a photoelectric conversion, to a first signal line; a first storage circuit that stores a voltage based on an electric current from a reference power supply circuit; and a first electric current source that supplies the first signal line with an electric current generated by the voltage stored in the first storage circuit, wherein: the first storage circuit stores the voltage based on the electric current from the power supply circuit when the first signal is not read out to the first signal line by the first readout circuit.

(2) In the image sensor as recited in (1), the image sensor further comprises a first photoelectric conversion unit that accumulates the electric charge resulting from the photoelectric conversion, wherein: the first storage circuit stores the voltage based on the electric current from the reference power supply circuit when the electric charge is accumulated by the first photoelectric conversion unit.

(3) In the image sensor as recited in (2), the image sensor further comprises: a second readout circuit that reads out a second signal, being generated by an electric charge resulting from a photoelectric conversion, to a second signal line, the second signal; a second storage circuit that stores a voltage based on an electric current from the reference power supply circuit; and a second electric current source that supplies the second signal line with an electric current generated by the voltage stored in the second storage circuit, wherein the second storage circuit stores the voltage based on the electric current from the reference power supply circuit when the second signal is not read out to the second signal line by the second readout circuit.

(4) In the image sensor as recited in (3), the first storage circuit and the second storage circuit respectively store the voltages based on the electric current from the reference power supply circuit in different timing to each other.

(5) In the image sensor as recited in (3) or (4), the image sensor further comprises a second photoelectric conversion unit that accumulates the electric charge resulting from the photoelectric conversion, wherein the second storage circuit stores a voltage based on an electric current from the reference power supply circuit when the electric charge is accumulated by the second photoelectric conversion unit.

(6) In the image sensor as recited in (5), the first storage circuit and the second storage circuit store the voltages based on the electric current from the reference power supply circuit before the electric charge accumulation of the first photoelectric conversion unit and the second photoelectric conversion unit is completed.

(7) In the image sensor as recited in (6), the first photoelectric conversion unit and the second photoelectric conversion unit have different electric charge accumulation times.

(8) In the image sensor as recited in (3) to (7), the image sensor further comprises: a first comparator circuit of an analog/digital conversion circuit that converts the first signal read out to the first signal line by the first readout circuit into a digital signal, the first comparator circuit being connected to the first signal line and having an input part for inputting the first signal; a first latch circuit that stores the first signal converted into a digital signal as an output result of the first comparator circuit; a second comparator circuit of an analog/digital conversion circuit that converts the second signal read out to the second signal line by the second readout circuit into a digital signal, the second comparator circuit being connected to the second signal line and having an input part for inputting the second signal; and a second latch circuit that stores the second signal converted into a digital signal as an output result of the second comparator circuit, wherein: the first latch circuit and the second latch circuit are provided on a second semiconductor substrate that is different from the first semiconductor substrate that is provided with the first readout circuit and the second readout circuit.

(9) In the image sensor as recited in (8), the first semiconductor substrate is stacked with the second semiconductor substrate.

(10) An image-capturing device comprising the image sensor as recited in (1) to (9).

The disclosure of the following priority application is herein incorporated by reference:

Japanese Patent Application No. 2015-195284 (filed Sep. 30, 2015)

REFERENCE SIGNS LIST

1 . . . image-capturing device, 6 . . . long exposure setting unit, 12 . . . photoelectric conversion unit, 30 . . . electric current source, 32 . . . storage unit, 31 . . . reference electric current source circuit, 100 . . . readout circuit

The invention claimed is:

1. An image sensor, comprising:
a first readout circuit that reads out a first signal, being generated by an electric charge resulting from a photoelectric conversion, to a first signal line;
a first holding circuit that holds a voltage based on an electric current from a power supply circuit; and
a first electric current source that supplies the first signal line with an electric current generated by the voltage held in the first holding circuit, wherein:
the first holding circuit holds the voltage based on the electric current from the power supply circuit when the first signal is not read out to the first signal line by the first readout circuit.

2. The image sensor according to claim 1, wherein:
the first readout circuit includes a first photoelectric conversion unit that accumulates the electric charge resulting from the photoelectric conversion, wherein
the first holding circuit holds the voltage based on the electric current from the power supply circuit when the electric charge is accumulated by the first photoelectric conversion unit.

3. The image sensor according to claim 2, further comprising:
a second readout circuit that reads out a second signal, being generated by an electric charge resulting from a photoelectric conversion, to a second signal line;
a second holding circuit that holds a voltage based on an electric current from the power supply circuit; and
a second electric current source that supplies the second signal line with an electric current generated by the voltage held in the second holding circuit, wherein
the second holding circuit holds the voltage based on the electric current from the power supply circuit when the second signal is not read out to the second signal line by the second readout circuit.

4. The image sensor according to claim 3, wherein the first holding circuit and the second holding circuit hold the voltages based on the electric current from the power supply circuit in different timing.

5. The image sensor according to claim 3, wherein:
the second readout circuit includes a second photoelectric conversion unit that accumulates the electric charge resulting from the photoelectric conversion; and
the second holding circuit holds a voltage based on an electric current from the power supply circuit when the electric charge is accumulated by the second photoelectric conversion unit.

6. The image sensor according to claim 5, wherein
The first holding circuit and the second holding circuit hold the voltages based on the electric current from the power supply circuit before the electric charge accumulation of the first photoelectric conversion unit and the second photoelectric conversion unit is completed.

7. The image sensor according to claim 6, wherein the first photoelectric conversion unit and the second photoelectric conversion unit have different electric charge accumulation times.

8. The image sensor according to claim 3, further comprising:
a first comparator circuit of an analog/digital conversion circuit that converts the first signal read out to the first signal line by the first readout circuit into a digital signal, the first comparator circuit being connected to the first signal line and having an input part for inputting the first signal;
a first latch circuit that stores the first signal converted into a digital signal as an output result of the first comparator circuit;
a second comparator circuit of an analog/digital conversion circuit that converts the second signal read out to the second signal line by the second readout circuit into a digital signal, the second comparator circuit being connected to the second signal line and having an input part for inputting the second signal; and
a second latch circuit that stores the second signal converted into a digital signal as an output result of the second comparator circuit, wherein
the first latch circuit and the second latch circuit are provided on a second semiconductor substrate that is different from the first semiconductor substrate that is provided with the first readout circuit and the second readout circuit.

9. The image sensor according to claim 8, wherein the first semiconductor substrate is stacked with the second semiconductor substrate.

10. An image-capturing device comprising the image sensor according to claim 1.

* * * * *